US008360645B2

(12) United States Patent
Omori

(10) Patent No.: US 8,360,645 B2
(45) Date of Patent: Jan. 29, 2013

(54) FOIL BEARING

(75) Inventor: Naomichi Omori, Tokyo (JP)

(73) Assignee: IHI Corporation, Tokyo (JP)

( * ) Notice: Subject to any disclaimer, the term of this patent is extended or adjusted under 35 U.S.C. 154(b) by 86 days.

(21) Appl. No.: 12/997,236

(22) PCT Filed: Jan. 21, 2009

(86) PCT No.: PCT/JP2009/050802
§ 371 (c)(1),
(2), (4) Date: Dec. 9, 2010

(87) PCT Pub. No.: WO2009/150861
PCT Pub. Date: Dec. 17, 2009

(65) Prior Publication Data
US 2011/0103725 A1  May 5, 2011

(30) Foreign Application Priority Data

Jun. 12, 2008  (JP) .................................. 2008-153632

(51) Int. Cl.
*F16C 32/06* (2006.01)
(52) U.S. Cl. .................... 384/106; 384/103; 384/105
(58) Field of Classification Search ........... 384/103–106
See application file for complete search history.

(56) References Cited

U.S. PATENT DOCUMENTS

| 3,635,534 A | * | 1/1972 | Barnett | 384/106 |
| 3,747,997 A | * | 7/1973 | Winn | 384/104 |
| 4,208,076 A | * | 6/1980 | Gray et al. | 384/105 |
| 4,227,753 A | * | 10/1980 | Wilcock | 384/105 |
| 4,668,106 A | * | 5/1987 | Gu | 384/105 |
| 4,950,089 A | * | 8/1990 | Jones | 384/103 |
| 5,911,510 A | * | 6/1999 | Saville | 384/103 |

FOREIGN PATENT DOCUMENTS

| JP | 61-38323 | 3/1986 |
| JP | 62-124321 | 8/1987 |
| JP | 63-9521 | 1/1988 |

(Continued)

OTHER PUBLICATIONS

International Search Report issued in corresponding International Application No. PCT/JP2009/050802, completed Mar. 9, 2009, mailed Mar. 24, 2009.
Thermal Management Phenomena in Foil Gas Thrust Bearings, Proceedings of GT2006, ASME Turbo Expo 2006; Power for Land, Sea and Air, May 8-11, 2006, Barcelona, Spain.

(Continued)

*Primary Examiner* — Thomas R Hannon
(74) *Attorney, Agent, or Firm* — Griffin & Szipl, P.C.

(57) ABSTRACT

A foil bearing supports a cylindrical rotary shaft 2, the foil bearing including: a hollow cylindrical outer ring 4 which is supported by a stationary member, and surrounds the rotary shaft with a predetermined gap therebetween; a thin-film-shaped top foil 3a which surrounds the outer surface of the rotary shaft, and of which one circumferential end is fixed to the inner surface of the outer ring; and a back foil 3b which is formed by a thin film sandwiched between the top foil and the inner surface of the outer ring and elastically supporting the top foil. The back foil 3b includes a support portion which comes into contact with the inner surface of the outer ring and is immovable in the circumferential direction, and an elastic portion which is supported by the support portion and is elastically bent in the radial direction by surface pressure from the top foil.

8 Claims, 11 Drawing Sheets

FOREIGN PATENT DOCUMENTS

| | | |
|---|---|---|
| JP | 63-166719 | 10/1988 |
| JP | 11-182614 | 7/1999 |
| JP | 2003148461 A | 5/2003 |
| JP | 2004270904 A | 9/2004 |
| JP | 2009-041736 | 2/2009 |
| KR | 10-0413059 | 7/2002 |
| KR | 10-2007-0035034 | 3/2007 |

OTHER PUBLICATIONS

S. Gray et al., Technology Progress on Compliant Foil Air Bearing Systems for Commercial Applications, Gas Bearing Symposium, Paper No. 6, pp. 69-97 (1981), filed herewith as Exhibit B.

Office Action issued in corresponding Korean application 10-2010-7027511 on Jun. 1, 2012.

* cited by examiner

FOIL BEARING

This is a National Phase Application in the United States of International Patent Application No. PCT/JP2009/050802 filed Jan. 21, 2009, which claims priority on Japanese Patent Application No. 2008-153632, filed Jun. 12, 2008. The entire disclosures of the above patent applications are hereby incorporated by reference.

BACKGROUND OF THE INVENTION

1. Technical Field of the Invention

The present invention relates to a foil bearing which includes a thin-film-shaped foil disposed on the outer periphery of a rotary shaft and an outer ring disposed on the outer periphery of the foil, and which rotatably supports the rotary shaft by forming a fluid lubrication membrane between the rotating rotary shaft and the foil.

2. Description of the Related Art

Foil bearings are used in turbo compressors, turbo chargers, micro gas turbines, and the like due to the benefit that oil is not required and that a fast rotating rotary shaft can be supported by using peripheral gas (for example, air) as an operation fluid.

An existing foil bearing is disclosed in, for example, the unpublished patent of Patent Document 1. In addition, the technology related to the invention is disclosed in Patent Document 2.

Further, the foil bearing is applied to a thrust bearing for supporting a fast rotating rotary shaft in the thrust direction (for example, Non-Patent Document 1).

In Patent Document 1, as shown in FIG. 1, the foil bearing includes a rotary shaft 51, a foil 52 which is wound on the outer periphery of the rotary shaft 51 as multiple layers, and an outer ring 53 which is provided on the outer periphery of the foil 52. A pair of stoppers 54 is provided in both ends of the outer ring 53 so that the foil 52 does not protrude in the axial direction.

Since a fluid lubrication membrane is formed between the rotary shaft 51 and the foil 52 when rotating the rotary shaft 51, the foil bearing 50 rotatably supports the rotary shaft 51.

The foil 52 includes a top foil of an inner peripheral side 52a and a back foil 52b of an outer peripheral side. As the back foil used in the past was a bump foil formed in a wave sheet shape as shown in FIG. 2.

Further, in the top foil 52a and the bump foil 52b, one ends are fixed to the outer ring 53 so as to prevent the separation thereof, and the other ends are formed as free ends.

The fluid lubrication membrane is formed between the top foil 52a and the rotary shaft 51 when rotating the rotary shaft 51, and the load acting on the rotary shaft 51 presses and deforms the top foil 52a via the fluid lubrication membrane. However, since the top foil is elastically supported by the bump foil, the deformation amount is restricted to an appropriate degree. In addition, since the bump foil (wave sheet) is deformed to widen the pitch of the individual wave when the top foil is deformed, sliding occurs between the top foil and the bump foil. However, since vibration energy is dissipated due to friction caused by the slide when the rotary shaft is vibrated, there is an advantage that the vibration (axial vibration) of the rotary shaft is suppressed. In Patent Document 2, as an alternative means for the function of the bump foil, used is a plurality of spring foils to stabilize the axial vibration.

[Non-Patent Document 1]
THERMAL MANAGEMENT PHENOMENA IN FOIL GAS THRUST BEARINGS, Proceedings of GT2006, ASME Turbo Expo 2006: Power for Land, Sea and Air, May 8-11, 2006, Barcelona, Spain

[Patent Document 1]
Japanese Patent Application No. 2007-209976, "FOIL BEARING DEVICE", 'UNPUBLISHED'

[Patent Document 2]
Japanese Patent Application Laid-Open No. 2004-270904, "FOIL FLUID BEARING"

In the aforementioned foil bearing 50, as shown in FIG. 3, since one end (the left end in the drawing) of the wave-sheet-shaped bump foil is fixed to the outer ring, when the bump foil is pressed from the top foil, each of the waves slides in the direction toward the free end (the right direction in the drawing) while widening the pitch thereof. However, since the slide is restrained as it approaches the fixed end, there are problems in that the estimation of the deformation stiffness of the wave, that is, the support stiffness of the top foil is difficult, and the desired support stiffness is not obtained. In addition, there are problems in that the slipping against the top foil becomes irregular (the slide becomes smaller as it approaches the fixed end, and becomes larger as it moves away from the fixed end) in accordance with the slide, and the estimation of vibration damping effect is difficult.

SUMMARY OF THE INVENTION

The invention is contrived in consideration of the above-described problems. That is, an object of the invention is to provide a foil bearing capable of supporting a rotary shaft by the use of a fluid lubrication membrane and elastically supporting the rotary shaft at the same or arbitrary stiffness distribution and damping characteristic.

According to the invention, there is provided a foil bearing that supports a cylindrical rotary shaft, comprising:

a hollow cylindrical outer ring which is supported by a fixed support surface, and surrounds the rotary shaft with a predetermined gap therebetween;

a thin-film-shaped top foil which surrounds the outer surface of the rotary shaft, and of which one circumferential end is fixed to the inner surface of the outer ring; and a back foil which is formed by a thin film sandwiched between the top foil and the inner surface of the outer ring and elastically supporting the top foil, wherein the back foil includes a support portion which comes into contact with the inner surface of the outer ring and is immovable in the circumferential direction, and an elastic portion which is supported by the support portion and is elastically bent in the radial direction by a surface pressure from the top foil.

According to the preferred embodiment of the invention, the support portion and the elastic portion of the back foil are formed by a single thin sheet, and the elastic portion includes a plurality of pleats bent inward from the support portion and folded at an inner end thereof so as to return to the support portion.

In addition, according to another embodiment, the support portion and the elastic portion of the back foil are formed by a single thin sheet, the elastic portion includes a plurality of pleats bent inward from the support portion and folded at an inner end thereof so as to return to the support portion, and the pleat is divided at the inner end such that divided portions of the pleat are held by each other.

The heights and/or the angles of the plurality of pleats are equal or different in accordance with a circumferential position.

Further, according to still another embodiment, the back foil is formed by two or more of foil sheets that are put on top of one another, and each of the foil sheets is formed by a single thin sheet, and includes a plurality of pleats that are formed by being bent inward or outward and being halfway folded back.

Furthermore, according to the invention, there is provided a foil bearing including: a bearing which supports a cylindrical rotary shaft; and a back foil which is formed by a thin film sandwiched between an outer peripheral surface of the bearing and a fixed support surface, and which elastically supports the outer peripheral surface of the bearing.

Moreover, according to the invention, there is provided a foil bearing that supports a thrust surface perpendicular to a rotary shaft, comprising:

a fixed support plate which includes a support surface opposite the thrust surface;

a thin-film-shaped top foil of which one circumferential end is fixed to the fixed support plate; and a back foil which is formed by a thin film sandwiched between the top foil and the fixed support plate and elastically supporting the top foil, wherein the back foil includes a support portion which comes into contact with the fixed support plate and is immovable in the circumferential direction, and an elastic portion which is supported by the support portion and is elastically bent in the thrust direction by a surface pressure from the top foil.

According to the configuration of the invention, the thin-film-shaped top foil surrounds the outer surface of the rotary shaft, and one circumferential end is fixed to the inner surface of the outer ring. Therefore, a fluid lubrication membrane is formed between the shaft and the top foil when rotating the shaft, and hence the rotary shaft can be supported by the fluid lubrication membrane.

In addition, the back foil includes the support portion and the elastic portion, the support portion comes into contact with the inner surface of the outer ring and is immovable in the circumferential direction, and then the elastic portion is supported to the support portion and is elastically bent in the radial direction by the surface pressure from the top foil. Therefore, the rotary shaft can be elastically supported at the same stiffness distribution and damping characteristic in the entire circumferential direction by uniformly forming the elastic portion in the circumferential direction. Alternatively, the rotary shaft can be elastically supported at an arbitrary stiffness distribution by allowing the elastic portion to have an arbitrary stiffness distribution and damping characteristic in the circumferential direction.

Further, the back foil can be applied to a thrust foil bearing.

DESCRIPTION OF THE PREFERRED EMBODIMENT

Figure 1:
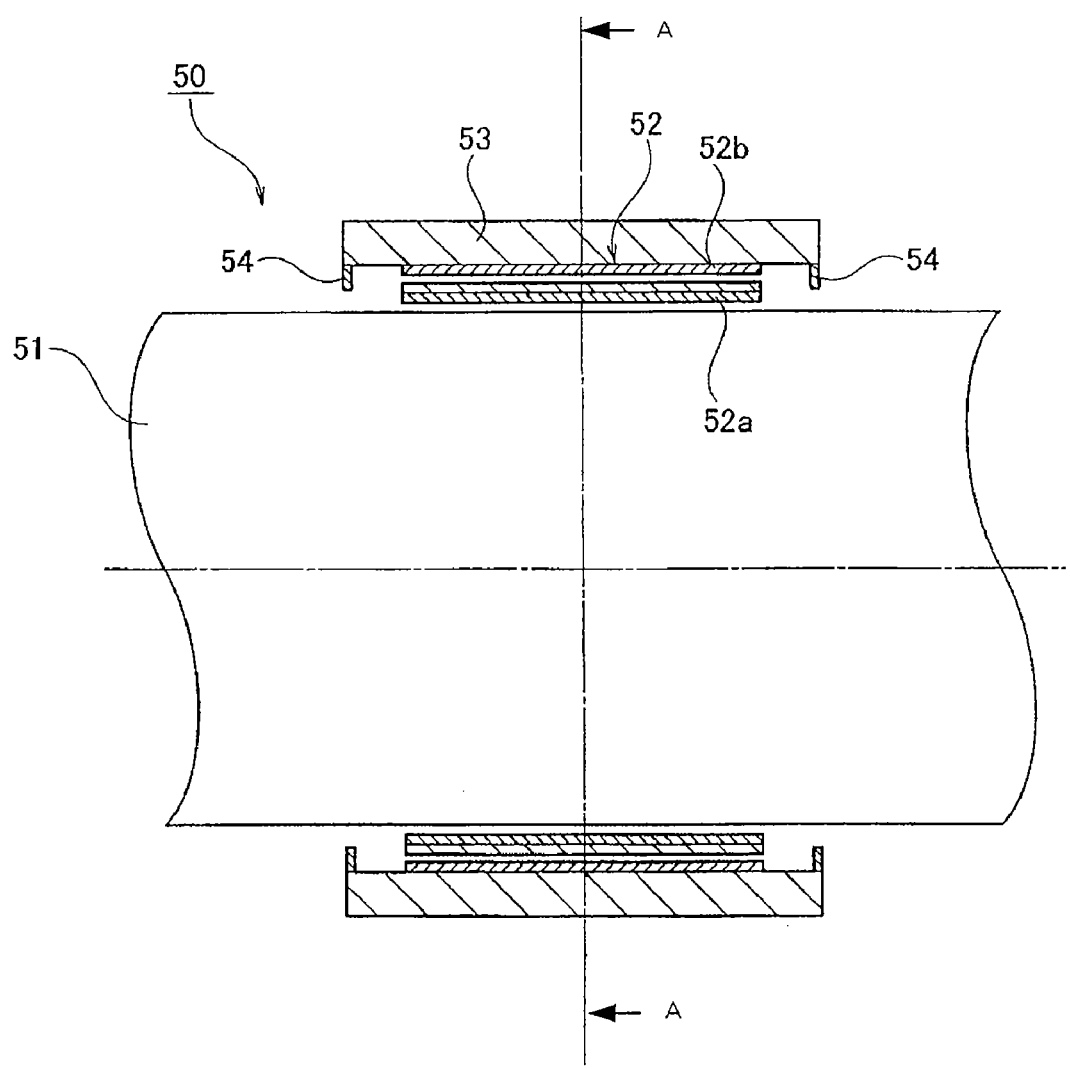
FIG. 1 is a sectional view showing a foil bearing of the unpublished patent document.
Figure 2:
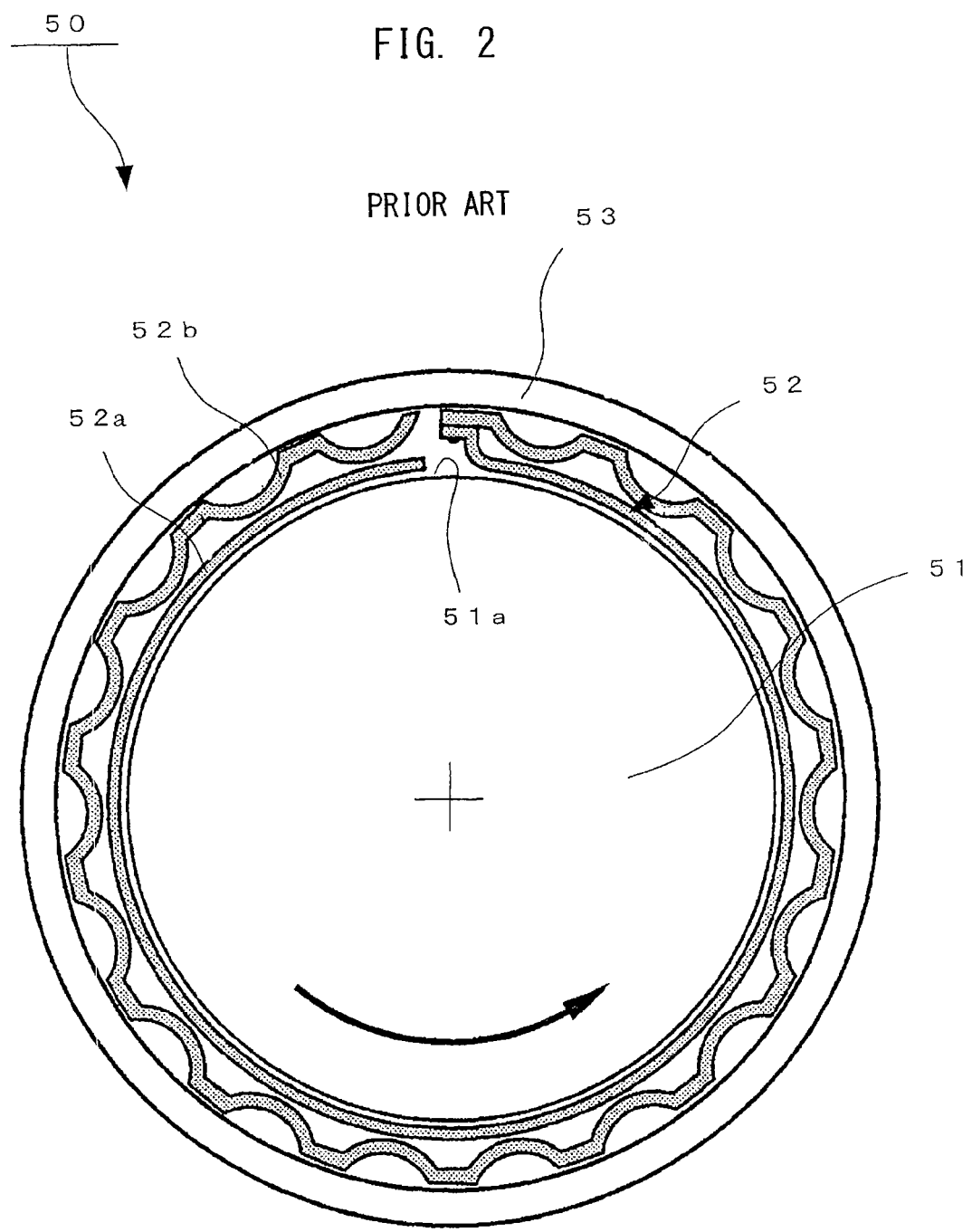
FIG. 2 is a cross-sectional view taken along the line A-A of FIG. 1.
Figure 3:
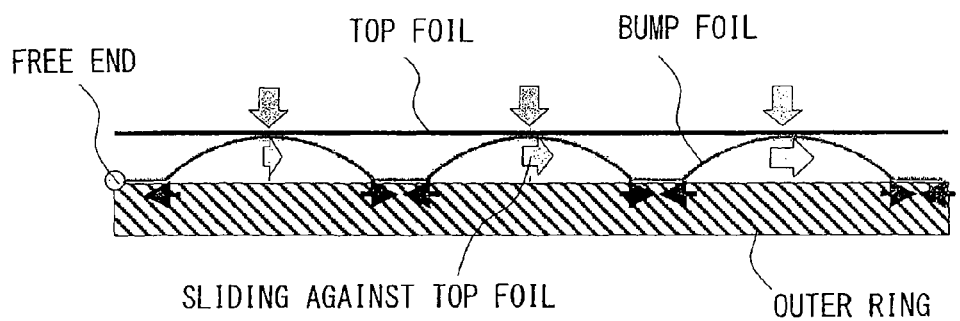
FIG. 3 is a schematic diagram showing an conventional back foil.

Hereinafter, the preferred embodiments of the invention will be described with reference to the drawings.

In addition, the same reference numerals will be given to the same components in the respective drawings, and the overlapping description will be omitted.

Figure 4:
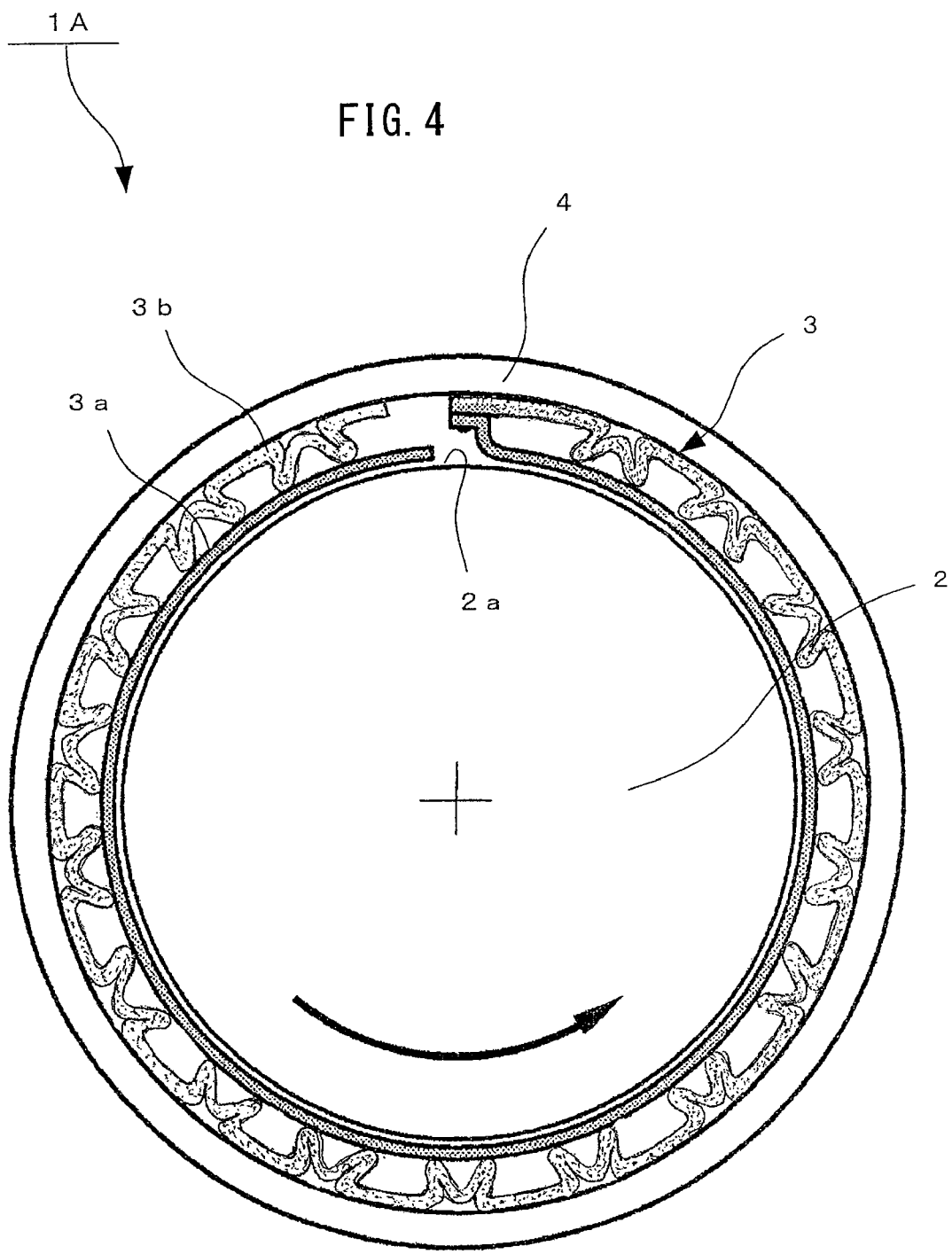
FIG. 4 is a diagram showing the first embodiment of a foil bearing according to the invention.

FIG. 4 is a diagram showing the first embodiment of a foil bearing according to the invention.

In FIG. 4, a foil bearing 1A of the invention includes a hollow cylindrical outer ring 4, a thin-film-shaped top foil 3a, and a back foil 3b formed by a thin film, and supports a rotary shaft 2.

The hollow cylindrical outer ring 4 is supported by a fixed support surface (not shown), and surrounds the rotary shaft 2 with a predetermined gap therebetween.

The thin-film-shaped top foil 3a surrounds an outer peripheral surface 2a of the rotary shaft, and one circumferential end thereof is fixed to the inner surface of the outer ring.

The back foil 3b formed by a thin film is sandwiched between the top foil 3a and the inner surface of the outer ring, and elastically supports the top foil 3a.

That is, as shown in FIG. 4, the foil bearing 1A includes the rotary shaft 2 which is rotated at a high speed by a driving means (not shown), the foil 3 (the top foil 3a and the back foil 3b) which is disposed on the outer periphery of the rotary shaft, and the outer ring 4 which is provided on the outer periphery of the foil.

The back foil 3b is a metallic thin film, and includes a support portion which comes into contact with the inner surface of the outer ring and is immovable in the circumferential direction, and an elastic portion which is supported by the support portion and is elastically bent in the radial direction by the surface pressure applied from the top foil 3a.

The outer ring 4 is formed in a cylindrical shape, where one ends of the top foil 3a and the back foil 3b are fixed to the inner peripheral surface thereof, and the inner peripheral surface comes into contact with the outer peripheral side of the back foil 3b. For example, the outer ring 4 is immovably supported by, for example, a housing (not shown) fixed at a stationary side relative to the rotary shaft 2 by the use of a pin (not shown) and the like with clearance fit.

Figure 5:
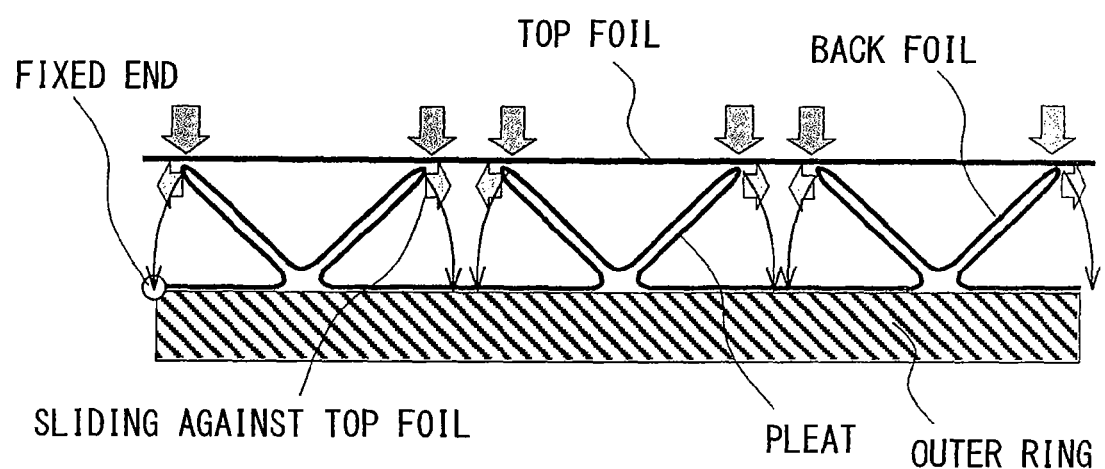
FIG. 5 is a diagram showing the first embodiment of a back foil 3b.

FIG. 5 is a diagram showing the first embodiment of the back foil 3b.

In this drawing, the support portion and the elastic portion of the back foil 3b are formed by a single thin film. In addition, the elastic portion includes a plurality of pleats bent obliquely inward (upward in the drawing) from the support portion and folded at the inner end (the peak) to return to the support portion.

Figure 6:
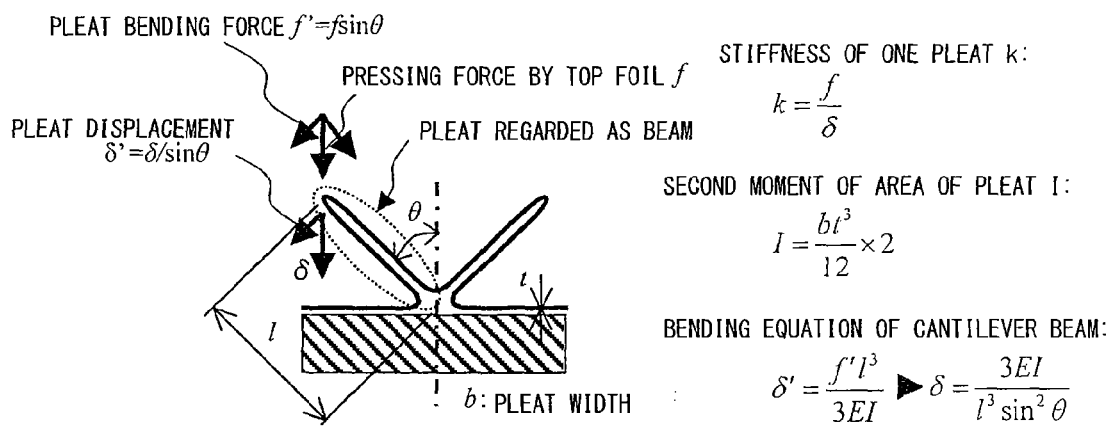
FIG. 6 is an analysis diagram showing support stiffness for each pleat of the back foil of the invention.
Figure 7:
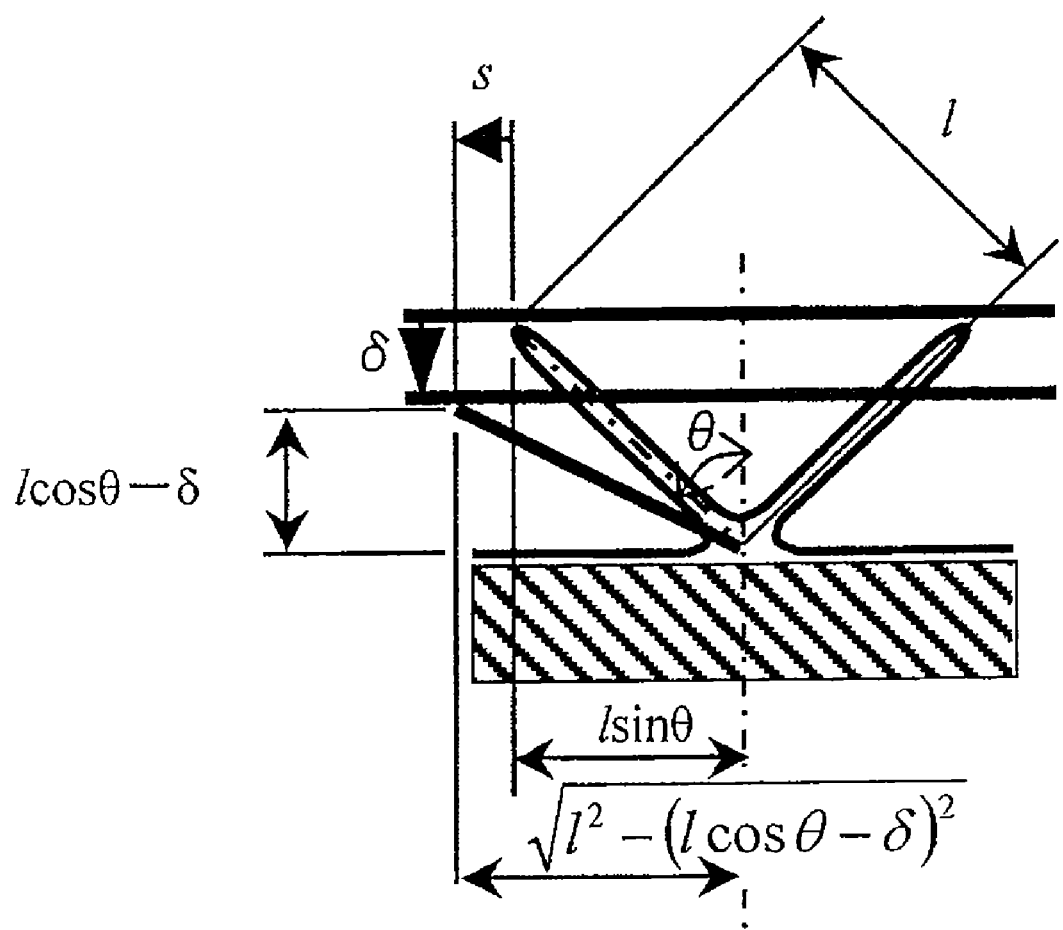
FIG. 7 is an analysis diagram showing a sliding amount of the pleat of the back foil of the invention.

FIG. 6 is an analysis diagram showing support stiffness for each pleat of the back foil of the invention. FIG. 7 is an analysis diagram showing a sliding amount of the pleat of the back foil of the invention.

As shown in FIG. 6, when the pleats are regarded as beams, the support stiffness k for each pleat can be expressed as the equation (1) of the expression 1.

In addition, the slide amount s of the pleat can be obtained as the equation (2) of the expression 1 from the geometrical calculation shown in FIG. 7.

[Expression 1]

$$k = \frac{Ebt^3}{2l^3(\sin\theta)^2} \quad (1)$$

$$s = \left\{\sqrt{1-\left(\cos\theta-\frac{\delta}{l}\right)^2} - \sin\theta\right\}l \quad (2)$$

Here, t: the sheet thickness of the back foil, b: the width (the length in the longitudinal direction of the bearing) of back foil, E: the longitudinal elastic coefficient of the material of the back foil, l: the length of the pleat, δ: the press amount (the displacement amount in the radial direction of the bearing) by the top foil, and θ: the angle between the pleat and the radial direction of the bearing.

Figure 8:
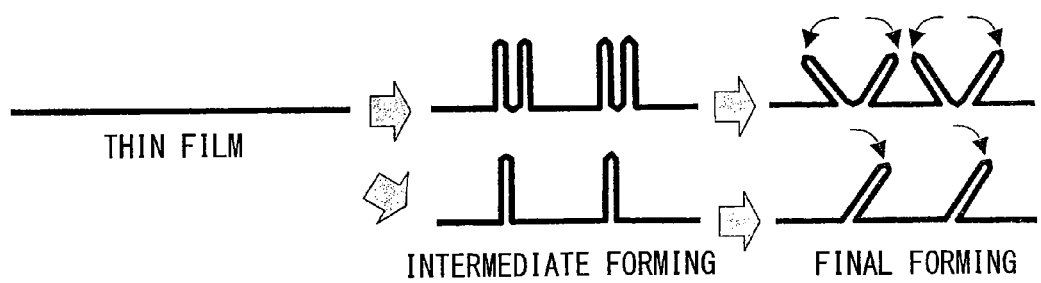
FIG. 8 is a diagram showing a method of forming the back foil of the invention.

FIG. 8 is a diagram showing a method of forming the back foil of the invention.

This drawing shows an example of the method of forming the back foil 3b having a pleat shape, and shows the method of forming the pleats from the thin film and bending the pleats. Since the back foil can be formed by one sheet of thin film, the manufacturing cost can be suppressed.

That is, as shown in this drawing, the back foil can be easily formed in such a manner that a plurality of pleats is formed in one sheet of thin film at an intermediate forming step, and each of the pleats is inclined at a final forming step.

In addition, the heights and/or the angles of the plurality of pleats may be equal or different in accordance with the circumferential position.

In the above-described configuration, since the fluid lubrication membrane is formed between the foil 3 and the rotary shaft 2 when rotating the rotary shaft, the foil bearing 1A rotatably supports the rotary shaft 2.

The deformation (bent deformation) of the adjacent pleats of the pleat-shaped back foil 3b does not cause a variation in the pitch dimension which occurs when a bump foil is deformed, and the pleats can be independently deformed. For this reason, it is possible to elastically support the top foil in the entire circumferential direction at the same stiffness distribution, or to elastically support the top foil at an arbitrary stiffness distribution by allowing the elastic portion to have an arbitrary stiffness distribution in the circumferential direction. In addition, although sliding occurs between the back foil and the top foil with the deformation of the pleat, since the slide amount can be set to a fixed amount as described above, a vibration damping effect using slide friction can be easily estimated.

The length and the like of the pleat at an arbitrary position of the entire circumference of the bearing can be changed such that a desired support stiffness or sliding amount is set. The support stiffness in the load direction of the bearing can be made to be strong, so that a bearing capable of enduring a greater load can be obtained. The slide against the top foil can be set to be large, so that vibration can be suppressed.

Figure 9:
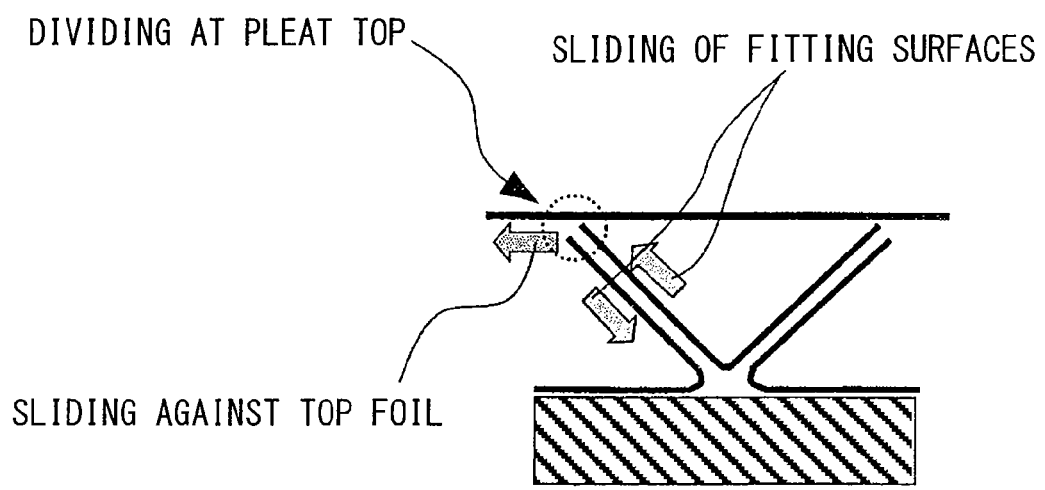
FIG. 9 is a diagram showing the second embodiment of the foil bearing according to the invention.

FIG. 9 is a diagram showing the second embodiment of the foil bearing according to the invention.

In this example, the support portion and the elastic portion of the back foil are formed by a single thin film. The elastic portion includes a plurality of pleats bent inward from the support portion and folded at the inner end to return to the support portion. The pleat is divided at the inner end such that divided portions of the pleat are held by each other. The pleat portion divided from the support portion due to the division at the inner end is received at the pleat portion (the V-shaped portion in FIG. 9) integrated with the support portion, and is held between the top foil and the pleat portion that is the V-shaped portion. Accordingly, the pleat is divided at the inner end such that divided portions of the pleat are held by each other.

As shown in this drawing, the pleat is divided at the pleat top such that divided portions of the pleat are held by each other, a higher vibration damping effect can be expected because sliding occurs in the fitting surfaces of the pleats.

Figure 10A:
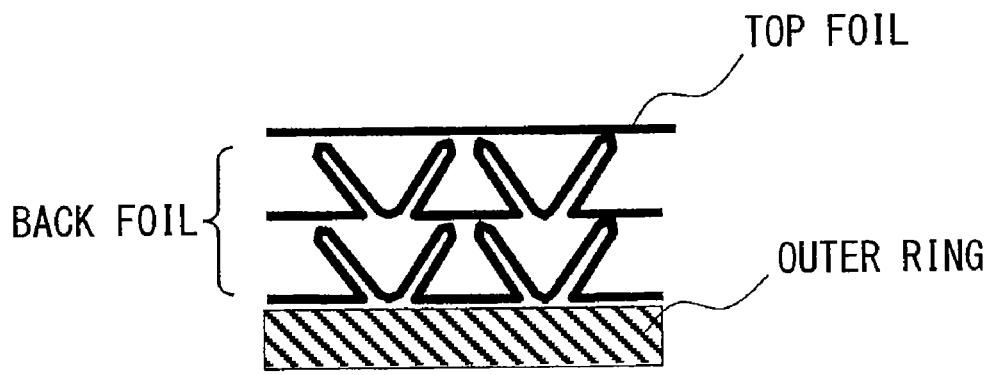
FIG. 10A is a configuration example of the third embodiment of the foil bearing according to the invention.
Figure 10B:
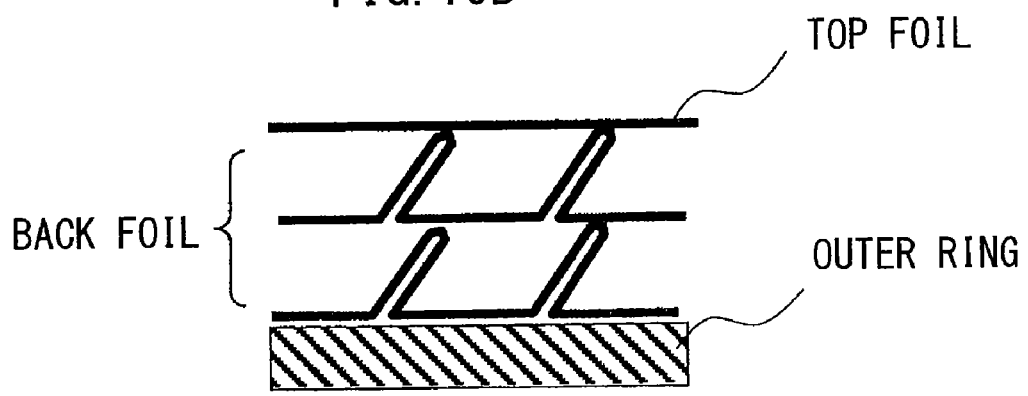
FIG. 10B is another configuration example of the third embodiment of the foil bearing according to the invention.
Figure 10C:
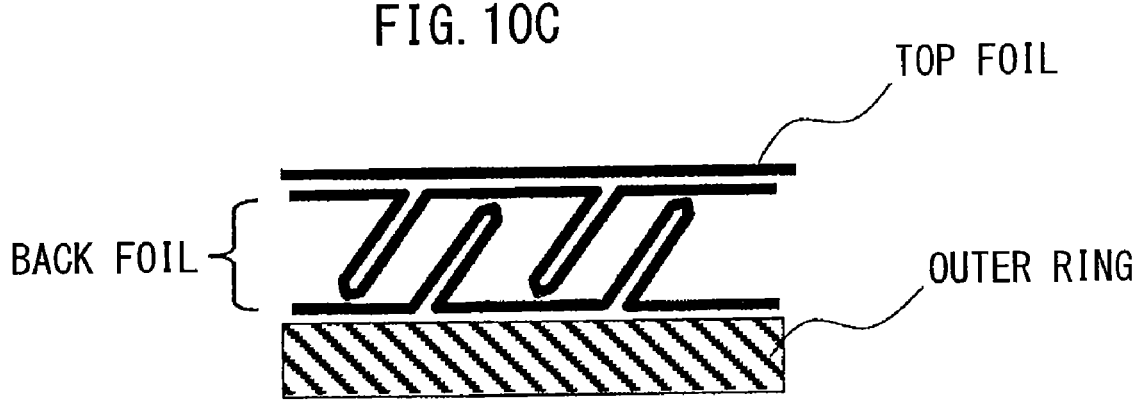
FIG. 10C is still another configuration example of the third embodiment of the foil bearing according to the invention.

FIGS. 10A, 10B, and 10C are diagrams showing the third embodiment of the foil bearing according to the invention.

In this example, the back foil is formed by two or more of foil sheets that are put on top of one another. Each of the foil sheets is formed by a single thin sheet, and includes a plurality of pleats of which part is bent inward or outward and halfway folded to return.

Likewise, an advantage of enhancing the vibration damping effect can be expected by a combination of the plurality of pleat-shaped back foils.

Figure 11:
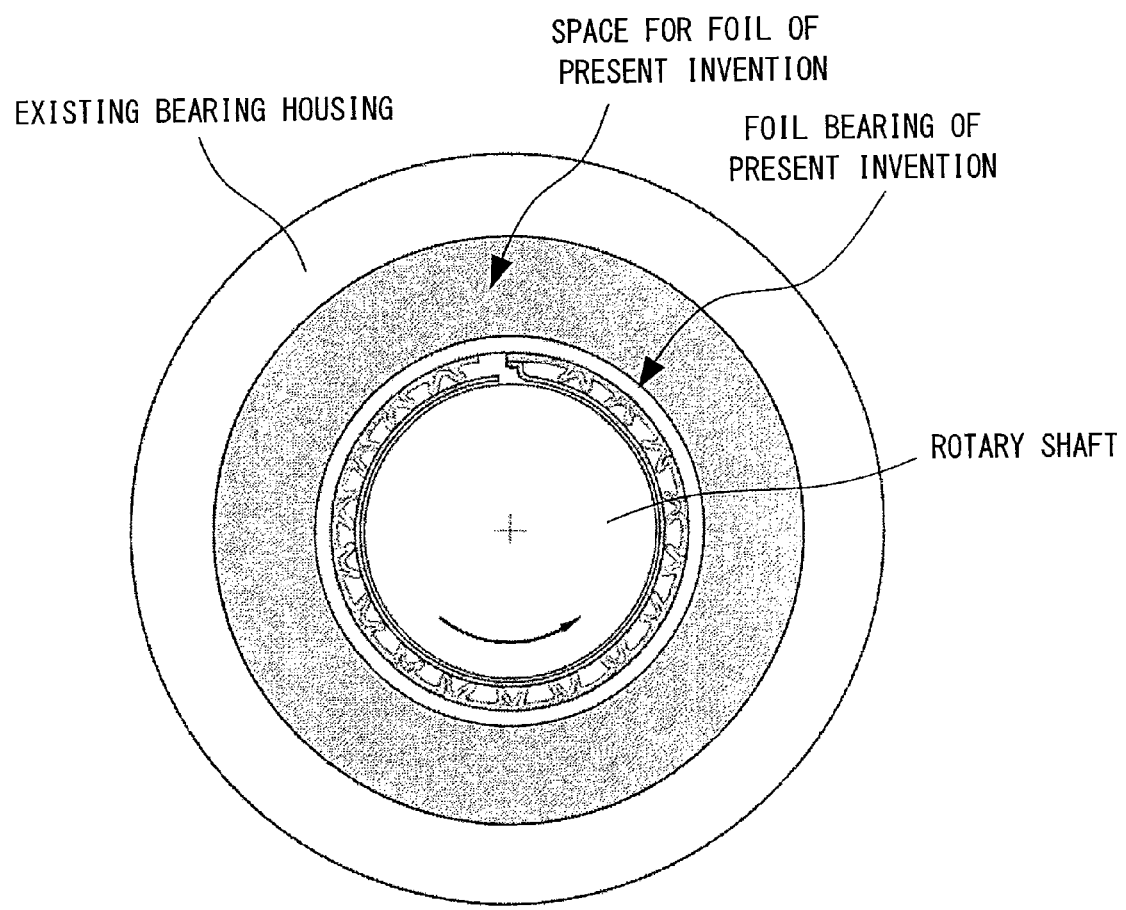
FIG. 11 is a diagram showing the fourth embodiment of the foil bearing according to the invention.

FIG. 11 is a diagram showing the fourth embodiment of the foil bearing according to the invention.

This example shows a state where for example, the foil (that is, the top foil 3a and the back foil 3b, or only the back foil 3b) of the first embodiment is attached between the foil bearing of the invention and the existing bearing housing, so that the higher vibration damping effect can be expected.

In addition, this configuration can be applied to not only the foil bearing of the first embodiment, but also the bearing of the conventional art. That is, the bearing supporting the rotary shaft is the foil bearing (the first embodiment) of the invention in this example, but may be an conventional general bearing.

In addition, the foil provided between the foil bearing of the invention and the conventional bearing housing is not limited to the foil (that is, the top foil 3a and the back foil 3b, or only the back foil 3b) of the first embodiment, but may have a pleat-shaped foil or the bump foil of the conventional art as long as the foil is the back foil formed by a thin film. That is, the outer peripheral surface of the bearing supporting the cylindrical rotary shaft may be elastically supported by the top foil 3a and the back foil 3b or the back foil in such a manner that the top foil 3a and the back foil 3b or the back foil formed by the thin film is sandwiched between the outer peripheral surface of the bearing supporting the cylindrical rotary shaft and the fixed support surface provided in the existing bearing housing or the like. When the top foil 3a and the back foil 3b are used, one circumferential ends of the top foil 3a and the back foil 3b may be fixed to the fixed support surface which faces the inside in the radial direction of the rotary shaft and extends in the circumferential direction. In this case, the fixed support surface has the same function as that of the inner surface of the outer ring.

With this configuration, even when the existing bearing is mounted already, the bearing can be installed by modifying the housing.

In addition, the foil bearing of the invention is not limited to the radial bearing, but may be applied to the thrust bearing. In this case, the foil bearing of the invention is a thrust foil bearing which supports a thrust surface perpendicular to the rotary shaft and provided in the rotary shaft, where a fixed support plate includes a support surface opposite the thrust surface, and one circumferential end of the top foil having a thin film shape is fixed to the fixed support plate. In addition, the back foil formed by the thin film is sandwiched between the top foil and the fixed support plate, and elastically supports the top foil. The back foil includes a support portion which comes into contact with the fixed support plate and is immovable in the circumferential direction, and an elastic portion which is supported by the support portion and is elastically bent in the thrust direction (that is, the axial direction of the rotary shaft) by the surface pressure from the back foil. Referring to FIG. 5, in this embodiment, the vertical direction of FIG. 5 corresponds to the thrust direction of FIG. 5, the horizontal direction of FIG. 5 corresponds to the circumferential direction, and then the "outer ring" of FIG. 5 corresponds to the fixed support plate. The support surface of the fixed support plate may have an annular shape in which an opening is formed at the center so as to allow the rotary shaft to pass therethrough. The top foil is disposed so that the top foil extends along the annular support surface. In addition, the portion supporting the top foil and the back foil in the radial direction from the inside and the outside in the radial direction of the rotary shaft may be provided in the stationary member (for example, the fixed support plate).

In other respects, the configuration is the same as that of the first embodiment.

The invention is not limited to the above-described embodiments, but may be, of course, modified into various forms within the scope of the invention.

The invention claimed is:

1. A foil bearing that supports a cylindrical rotary shaft, the foil bearing comprising:
   (a) a hollow cylindrical outer ring supported by a fixed support surface, and that surrounds the rotary shaft with a predetermined gap therebetween;
   (b) a thin-film-shaped top foil that surrounds an outer surface of the rotary shaft, wherein one circumferential end of the thin-film shaped top foil is fixed to an inner surface of the outer ring; and
   (c) a back foil that is formed by a thin film sandwiched between the top foil and the inner surface of the outer ring, and the back foil elastically supports the top foil,
   wherein the back foil includes
      i. a support portion that comes into contact with the inner surface of the outer ring and is immovable in a circumferential direction; and
      ii. an elastic portion that is supported by the support portion, and the elastic portion is elastically bent in a radial direction by a surface pressure from the top foil.

2. The foil bearing according to claim 1, wherein the support portion and the elastic portion of the back foil are formed by a single thin sheet, and the elastic portion includes a plurality of pleats bent inward from the support portion and folded at an inner end thereof so as to return to the support portion.

3. The foil bearing according to claim 2,
   wherein heights or angles, or the heights and the angles, of the plurality of pleats are equal or different in accordance with a circumferential position.

4. The foil bearing according to claim 1,
   wherein the back foil is formed by two or more of foil sheets that are put on top of one another, and
   wherein each of the foil sheets is formed by a single thin sheet, and includes a plurality of pleats that are formed by being bent inward or outward and being halfway folded back.

5. The foil bearing according to claim 1,
   wherein the support portion and the elastic portion of the back foil are formed by a single thin sheet, and the elastic portion includes a plurality of pleats bent inward from the support portion and folded at an inner end thereof so as to return to the support portion, and
   wherein each pleat is divided at an inner end so that divided portions of each pleat are held by each other.

6. The foil bearing according to claim 5,
   wherein heights or angles, or the heights and the angles, of the plurality of pleats are equal or different in accordance with a circumferential position.

7. A foil bearing comprising:
   (a) a thin-film-shaped top foil that surrounds an outer surface of a rotary shaft, wherein one circumferential end of the top foil is fixed to a fixed support surface; and
   (b) a back foil, formed by a thin film sandwiched between the top foil and the fixed support surface, that elastically supports the top foil,
   wherein the top foil and the back foil are provided between the fixed support surface and a bearing that supports the rotary shaft, and
   wherein the back foil includes a support portion that comes into contact with the fixed support surface and that is immovable in a circumferential direction, and an elastic portion that is supported by the support portion and is elastically bent in a radial direction by a surface pressure from the top foil.

8. A foil bearing that supports a thrust surface perpendicular to a rotary shaft, comprising:
   (a) a fixed support plate that includes a support surface opposite the thrust surface;
   (b) a thin-film-shaped top foil, wherein one circumferential end of the top foil is fixed to the fixed support plate; and
   (c) a back foil that is formed by a thin film sandwiched between the top foil and the fixed support plate, and the back foil elastically supports the top foil,
   wherein the back foil includes
      i. a support portion that comes into contact with the fixed support plate and that is immovable in a circumferential direction; and
      ii. an elastic portion that is supported by the support portion and that is elastically bent in a thrust direction by a surface pressure from the top foil,
   wherein the support portion and the elastic portion of the back foil are formed by a single thin sheet, and the elastic portion includes a plurality of pleats bent toward the top foil from the support portion and folded at a top-foil-side end thereof so as to return to the support portion.

* * * * *